(12) United States Patent
Port et al.

(10) Patent No.: US 12,535,543 B2
(45) Date of Patent: Jan. 27, 2026

(54) SYSTEM AND METHOD FOR PROTON AND PHOSPHORUS MAGNETIC RESONANCE IMAGING

(71) Applicant: Mayo Foundation for Medical Education and Research, Rochester, MN (US)

(72) Inventors: John D. Port, Rochester, MN (US); Joel P. Felmlee, Rochester, MN (US); Yunhong Shu, Rochester, MN (US); Joshua D. Trzasko, Rochester, MN (US); Aiming Lu, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 1057 days.

(21) Appl. No.: 17/058,867

(22) PCT Filed: May 31, 2019

(86) PCT No.: PCT/US2019/035051
§ 371 (c)(1),
(2) Date: Nov. 25, 2020

(87) PCT Pub. No.: WO2019/232476
PCT Pub. Date: Dec. 5, 2019

(65) Prior Publication Data
US 2021/0223338 A1    Jul. 22, 2021

Related U.S. Application Data

(60) Provisional application No. 62/678,631, filed on May 31, 2018.

(51) Int. Cl.
*G01R 33/00*        (2006.01)
*G01R 33/36*        (2006.01)
(Continued)

(52) U.S. Cl.
CPC ....... *G01R 33/3635* (2013.01); *G01R 33/446* (2013.01); *G01R 33/4824* (2013.01);
(Continued)

(58) Field of Classification Search
CPC .............. G01R 33/3635; G01R 33/446; G01R 33/4824; G01R 33/4828; G01R 33/485; G01R 33/5608
See application file for complete search history.

(56) References Cited

U.S. PATENT DOCUMENTS 8,989,465 B2    3/2015  Trzasko
9,709,650 B2 *  7/2017  Trzasko ............. G01R 33/5611

FOREIGN PATENT DOCUMENTS

WO   WO-2004095049 A1 *  11/2004   ......... G01R 33/4816
WO      2018187662 A1    10/2018

OTHER PUBLICATIONS

N.I. Avdievich, H.P. Hetherington, 4T Actively detuneable double-tuned 1H/31P head vol. coil and four-channel 31P phased array for human brain spectroscopy, Journal of Magnetic Resonance, vol. 186, Issue 2, 2007, pp. 341-346, ISSN 1090-7807, https://doi.org/10.1016/j.jmr.2007.03.001.*

(Continued)

*Primary Examiner* — Keith M Raymond
*Assistant Examiner* — Adam D. Kolkin
(74) *Attorney, Agent, or Firm* — Quarles & Brady LLP (57) ABSTRACT

The present disclosure addresses the challenges of in vivo phosphorus imaging by providing a clinically useful phosphorus MRI (PMRI) system and method that may be performed on a standard MRI system in a clinically reasonable scan time using specifically tuned coils, a phosphorus pulse sequence, and improved reconstruction and post processing algorithms.

13 Claims, 6 Drawing Sheets

(51) Int. Cl.

| | |
|---|---|
| *G01R 33/44* | (2006.01) |
| *G01R 33/48* | (2006.01) |
| *G01R 33/485* | (2006.01) |
| *G01R 33/56* | (2006.01) |

(52) U.S. Cl.
CPC ....... *G01R 33/4828* (2013.01); *G01R 33/485* (2013.01); *G01R 33/5608* (2013.01)

(56) References Cited

OTHER PUBLICATIONS

Meyerspeer, M., Magill, A.W., Kuehne, A., Gruetter, R., Moser, E. and Schmid, A.I. (2016), Simultaneous and interleaved acquisition of NMR signals from different nuclei with a clinical MRI scanner. Magn. Reson. Med., 76: 1636-1641. https://doi.org/10.1002/mrm.26056.*

Panda, A., Jones, S., Stark, H., Raghavan, R.S., Sandrasegaran, K., Bansal, N. and Dydak, U. (2012), Phosphorus liver MRSI at 3T using a novel dual-tuned eight-channel 31P/1H coil. Magn Reson Med, 68: 1346-1356. https://doi.org/10.1002/mrm.24164.*

Arunachalam, A., et al., Accelerated spectroscopic imaging of hyperpolarized C-13 pyruvate using SENSE parallel imaging. NMR in biomedicine, 2009. 22(8): p. 867-73.

Blenman RA, et al. Selective maximization of (31)P MR spectroscopic signals of in vivo human brain metabolites at BT. J Magn Reson Imaging, 2007. 25(3): p. 628-34.

Blenman RA, et al. Large flip angle phosphorus-31 MRS of the brain at 3T. International Society for Magnetic Resonance in Medicine Workshop on MR Spectroscopy for Neuropsychiatric Disorders, Proffered Paper session 7 Banff, Alberta, Canada, 2005.

Blenman RM, et al. In vivo measurement of T1 relaxation times of 31P metabolites in human brain at 3T. Proceedings of the 14th Scientific Meeting of the International Society for Magnetic Resonance in Medicine, 2006.

Blenman RM, et al. Scan Time Reduction and Selective Maximization of Three Metabolites of Interest with 31P LFA-MRS in Human Brain at 3T. Proceedings of the Joint Annual Meeting of the International Society for Magnetic Resonance in Medicine and the European Society for Magnetic Resonance in Medicine and Biology Berlin, Germany 2007.

Boada, F.E., et al., Quantitative in vivo tissue sodium concentration maps: the effects of biexponential relaxation. Magnetic Resonance in Medicine, 1994. 32(2): p. 219-23.

Brown, R. et al. "Magnetic resonance imaging of phosphocreatine and determination of BOLD kinetics in lower extremity muscles using a dual-frequency coil array." Scientific reports 6.1 (2016): 1-8.

Brown, R., et al. "A nested phosphorus and proton coil array for brain magnetic resonance imaging and spectroscopy." Neuroimage 124 (2016): 602-611.

Fessler, J. A., et al. (2003). Nonuniform fast Fourier transforms using min-max interpolation. IEEE transactions on signal processing, 51(2), 560-574.

Gonen, O. et al. "Simultaneous 3D NMR spectroscopy of proton-decoupled fluorine and phosphorus in human liver during 5-fluorouracil chemotherapy." Magnetic resonance in medicine 37.2 (1997): 164-169.

Houkin, K., et al. "31P magnetic resonance spectroscopy of chronic cerebral infarction in rats." NMR in Biomedicine 2.2 (1989): 83-86.

International Searching Authority. International Search Report and Written Opinion for application PCT/US2019/035051. Mailed on Sep. 20, 2019.

Klomp, D. W., et al. (2011). 31P MRSI and 1H MRS at 7 T: initial results in human breast cancer. NMR in Biomedicine, 24(10), 1337-1342.

Komoroski, R. A., et al. (2011). 31P NMR of phospholipid metabolites in prostate cancer and benign prostatic hyperplasia. Magnetic resonance in medicine, 65(4), 911-913.

Lam F et al., A subspace approach to high-resolution spectroscopic imaging. Magnetic resonance in medicine : official journal of the Society of Magnetic Resonance in Medicine / Society of Magnetic Resonance in Medicine, 2014. 71(4): p. 1349-57.

Lanza IR, et al. Measurement of human skeletal muscle oxidative capacity by 31P-MR spectroscopy: a cross-validation with in vitro measurements. J Magn Reson Imaging, 2011. 34(5): p. 1143-50.

Liu, Y et al. Fast 31P Chemical Shift Imaging Using Multi-Spiral Acquisition at 9.4T. Proceedings of the International Society for Magnetic Resonance in Medicine. Vol 23, 615 May 2015, p. 4714.

Martinez-Outschoorn, U. E., et al. "Cancer metabolism: a therapeutic perspective." Nature reviews Clinical oncology 14.1 (2017): 11-31.

Mecheri, G., et al. "In vivo hippocampal 31P NMR metabolites in Alzheimer's disease and ageing." European psychiatry 12.3 (1997): 140-148.

Medgadget. "New MRI Technique Visualizes Phosphorus, Opens Potential for Hard Tissue Imaging" Mar. 1, 2012. Accessed online at https://www.medgadget.com/2012/03/new-mri-technique-visualizes-phosphorus-opens-potential-for-hard-tissue-imaging.html on Dec. 4, 2020.

Meyerspeer, M., et al. "Simultaneous and interleaved acquisition of NMR signals from different nuclei with a clinical MRI scanner." Magnetic resonance in medicine 76.5 (2016): 1636-1641.

Moore, G. J., et al. "Simultaneous multinuclear magnetic resonance imaging and spectroscopy." Magnetic resonance in medicine 19.1 (1991): 105-112.

Neubauer, S. "Metabolic imaging with cardiac magnetic resonance spectroscopy." Heart Metab 44 (2009): 17-20.

Noren, B., et al. "Absolute quantification of human liver metabolite concentrations by localized in vivo 31 P NMR spectroscopy in diffuse liver disease." European radiology 15.1 (2005): 148-157.

Parasoglou, P., et al., Rapid 3D-imaging of phosphocreatine recovery kinetics in the human lower leg muscles with compressed sensing. Magnetic resonance in medicine : official journal of the Society of Magnetic Resonance in Medicine / Society of Magnetic Resonance in Medicine, 2012. 68(6): p. 1738-46.

Parasoglou, P., et al., Three-dimensional mapping of the creatine kinase enzyme reaction rate in muscles of the lower leg. NMR in biomedicine, 2013. 26(9): p. 1142-51.

Port JD, et al. Developing a 31P Mr Spectroscopy Program: The Mayo Clinic Experience. American Society of Neuroradiology 42nd Annual Meeting, 2004: p. 412.

Port JD, et al. Development of a lithium MR imaging sequence. in Society for Molecular Imaging: World Molecular Imaging Congress. 2008. Nice, France.

Posse, S., et al., MR spectroscopic imaging: principles and recent advances. Journal of magnetic resonance imaging : JMRI, 2013. 37(6): p. 1301-25.

Prompers, J. J., et al. (2006). Dynamic MRS and MRI of skeletal muscle function and biomechanics. NMR in Biomedicine: An International Journal Devoted to the Development and Application of Magnetic Resonance In vivo, 19(7), 927-953.

Robson et al., Human imaging of phosphorus in cortical and trabecular bone in vivo. Magnetic resonance in medicine : official journal of the Society of Magnetic Resonance in Medicine / Society of Magnetic Resonance in Medicine, 2004. 51(5): p. 888-92.

Rodgers, C. T., et al. (2016). Coil combination for receive array spectroscopy: Are data-driven methods superior to methods using computed field maps ?. Magnetic resonance in medicine, 75(2), 473-487.

Scheenen, TWJ et al. 31P MR Spectroscopic Imaging of the Human Brain at 7 T with Nuclear Overhauser Enhancement. Proceedings of the International Society for Magnetic Resonance in Medicine. vol. 21, Apr. 6, 2013, p. 3964.

Sun, Y. et al. "Imaging human teeth by phosphorus magnetic resonance with nuclear Overhauser enhancement." Scientific reports 6 (2016): 30756.

Trzasko et al. Calibrationless Parallel MRI Using ORACLE (Overlapping Low-Rank Approximations for Coil Image Estimation). The 45th Asilomar Conference on IEEE, 2011.

(56) References Cited

OTHER PUBLICATIONS

Valkovic L, et al. Dynamic 31P-MRSI using spiral spectroscopic imaging can map mitochondrial capacity in muscles of the human calf during plantar flexion exercise at 7 T. Nmr in Biomedicine. 2016;29(12):1825-1834.

Wiens, Curtis N., et al. "Chemical shift encoded imaging of hyperpolarized 13C pyruvate." Magnetic resonance in medicine 74.6 (2015): 1682-1689.

Wiesinger, F, et al. "IDEAL spiral CSI for dynamic metabolic MR imaging of hyperpolarized [1-13C] pyruvate." Magnetic resonance in medicine 68.1 (2012): 8-16.

Zhou, Y., et al. "Intracellular ATP Levels are a Pivotal Determinant of Chemoresistance in Colon Cancer Cells." Cancer research 72.1 (2012): 304.

Zollner, J. P., et al. "Changes of pH and energy state in subacute human ischemia assessed by multinuclear magnetic resonance spectroscopy." Stroke 46.2 (2015): 441-446.

Avdievich, N.I. et al., "4T Actively-Detunable Double-Tuned 1H/31P TEM Head Volume Coil and Four-Channel 31P Phased Array for Human Brain Spectroscopy", Proc. Intl. Soc. Mag. Reson. Med. 14 (2006), p. 2595.

\* cited by examiner

SYSTEM AND METHOD FOR PROTON AND PHOSPHORUS MAGNETIC RESONANCE IMAGING

CROSS-REFERENCE TO RELATED APPLICATIONS

This application is a 371 U.S. National Phase application of PCT/US2019/035051, filed May 31, 2019, which claims the benefit of U.S. Provisional Patent Application Ser. No. 62/678,631, filed on May 31, 2018, and entitled "SYSTEM AND METHOD FOR PHOSPHORUS MAGNETIC RESONANCE IMAGING," which is herein incorporated by reference in its entirety.

BACKGROUND

Modern magnetic resonance imaging (MRI) scanners create medical images of protons within water and fat of a subject. However, there are many other elements that are of interest to image within the body. Phosphorus is an abundant element used in energy compounds and cell membrane compounds. Creating a phosphorus image of the body may grant the ability to visualize metabolic processes within a subject.

Previous attempts to image phosphorus have struggled with low concentrations, a wide range of chemical shift, the low resonance frequency and the generally poor MR sensitivity of phosphorus. There is also a large corresponding unmet clinical need for imaging methods that can detect relevant metabolic abnormalities in disease not visible using conventional proton-based MRI.

SUMMARY OF THE DISCLOSURE

The present disclosure addresses the aforementioned drawbacks by providing a clinically useful phosphorus MRI (PMRI) system and method that can be performed on a standard MRI system in a clinically reasonable scan time. The system includes a multi-channel MR coil specifically tuned for detecting phosphorus signals, a pulse sequence for exciting phosphorus in a subject, and employs improved reconstruction/denoising algorithms.

In one aspect of the present disclosure, a method for generating images from data acquired from proton spins and phosphorous spins using an MRI system is provided. First data are acquired from a subject using the MRI system, wherein the first data are indicative of proton signals. Second data are also acquired from the subject using the MRI system, wherein the second data are indicative of phosphorous signals. The first data and the second data may be acquired sequentially or simultaneously. A first image is reconstructed from the first data, wherein the first image is a proton image that depicts anatomical structures in the subject. A second image is reconstructed from the second data, wherein the second image is a phosphorous image that depicts metabolic information in the subject.

It is another aspect of the present disclosure to provide a system for acquiring data using an MRI system. The system includes a radio frequency (RF) system and a computer system. The RF system includes at least one RF coil and an RF generator configured to excite proton spins and phosphorous spins and to receive magnetic resonance signals therefrom. The computer system is programmed or otherwise configured to operate the RF system to excite proton spins and acquire first data from a subject, wherein the first data are indicative of proton signals; operate the RF system to excite phosphorous spins and acquire second data from the subject, wherein the second data are indicative of phosphorous signals; reconstruct a first image from the first data, wherein the first image is a proton image that depicts anatomical structures in the subject; and reconstruct a second image from the second data, wherein the second image is a phosphorous image that depicts metabolic information in the subject.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

The present disclosure addresses the challenges of in vivo phosphorus imaging by providing a clinically useful phosphorus MRI (PMRI) system and method that may be implemented with a standard 3T MRI system in a clinically reasonable scan time. For instance, the systems and methods may use specifically tuned coils, a phosphorus pulse sequence, and improved image reconstruction and post processing algorithms. The challenges to detect adenosine triphosphate (ATP) and phosphocreatine (PCr) with MRI at 3 T include: relatively low concentrations (e.g., 1-14 mM in human tissues), wide range of chemical shift (e.g., −5 to 25 ppm compared to 0-5 ppm for proton), low resonance frequency (e.g., 51.7 MHz compared to 127.7 MHz at 3 T), and poor MR sensitivity of phosphorus (e.g., 6.6% when compared to proton signal). Each of these challenges are addressed by aspects of the present disclosure.

Whereas proton imaging provides structural information about a subject, the information provided by metabolically important phosphorous-31 ($^{31}P$) nuclei imaging could be of tremendous and unique value, which includes: skeletal muscle function and biomechanics; cardiac energetics; liver biochemical information; breast tumor metabolism; and prostate cancer diagnosis. Adenosine triphosphate (ATP) and phosphocreatine (PCr) are intracellular phosphorus-containing compounds involved in cellular energy metabolism. These compounds can be abnormal in many diseases including: cancer; brain ischemia and stroke; and neurological diseases like Alzheimer's diseases. The present disclosure provides for the quantification of ATP levels in individuals, and also the measurement of ATP fluxes (e.g., synthesis and consumption rates of ATP). The present disclosure also enables the investigation of multiple aspects of mitochondrial function and disease (e.g., roll of aging and declining mitochondrial function) and measuring response to therapies focused on treating mitochondrial diseases and restoring/maintaining mitochondrial function. Imaging phosphorus in a clinical environment using the systems and methods described in the present disclosure provides improved capabilities for the detection and diagnosis of many diseases and conditions.

Figure 1:
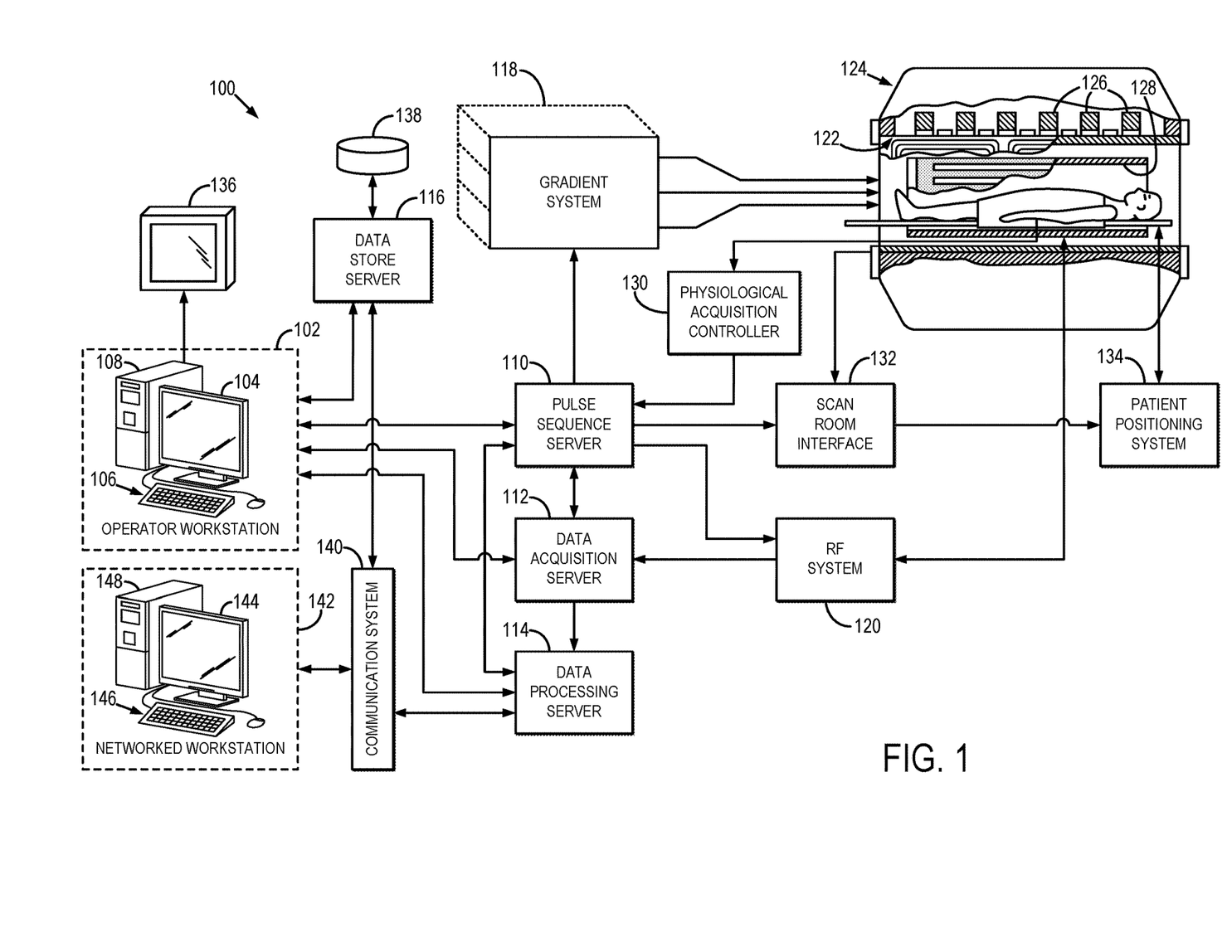
FIG. 1 is a pictorial representation of an MRI system which employs an implementation of the present disclosure.

Referring particularly now to FIG. 1, an example of an MRI system 100 that can implement the methods described here is illustrated. The MRI system 100 includes an operator workstation 102 that may include a display 104, one or more input devices 106 (e.g., a keyboard, a mouse), and a processor 108. The processor 108 may include a commercially available programmable machine running a commercially available operating system. The operator workstation 102 provides an operator interface that facilitates entering scan parameters into the MRI system 100. The operator workstation 102 may be coupled to different servers, including, for example, a pulse sequence server 110, a data acquisition server 112, a data processing server 114, and a data store server 116. The operator workstation 102 and the servers 110, 112, 114, and 116 may be connected via a communication system 140, which may include wired or wireless network connections.

The pulse sequence server 110 functions in response to instructions provided by the operator workstation 102 to operate a gradient system 118 and a radiofrequency ("RF") system 120. Gradient waveforms for performing a prescribed scan are produced and applied to the gradient system 118, which then excites gradient coils in an assembly 122 to produce the magnetic field gradients $G_x$, $G_y$, and $G_z$ that are used for spatially encoding magnetic resonance signals. The gradient coil assembly 122 forms part of a magnet assembly 124 that includes a polarizing magnet 126 and a whole-body RF coil 128.

RF waveforms are applied by the RF system 120 to the RF coil 128, or a separate local coil to perform the prescribed magnetic resonance pulse sequence. Responsive magnetic resonance signals detected by the RF coil 128, or a separate local coil, are received by the RF system 120. The responsive magnetic resonance signals may be amplified, demodulated, filtered, and digitized under direction of commands produced by the pulse sequence server 110. The RF system 120 includes an RF transmitter for producing a wide variety of RF pulses used in MRI pulse sequences. The RF transmitter is responsive to the prescribed scan and direction from the pulse sequence server 110 to produce RF pulses of the desired frequency, phase, and pulse amplitude waveform. The generated RF pulses may be applied to the whole-body RF coil 128 or to one or more local coils or coil arrays.

The RF system 120 also includes one or more RF receiver channels. An RF receiver channel includes an RF preamplifier that amplifies the magnetic resonance signal received by the coil 128 to which it is connected, and a detector that detects and digitizes the I and Q quadrature components of the received magnetic resonance signal. The magnitude of the received magnetic resonance signal may, therefore, be determined at a sampled point by the square root of the sum of the squares of the I and Q components:

$$M = \sqrt{I^2 + Q^2} \tag{1}$$

and the phase of the received magnetic resonance signal may also be determined according to the following relationship:

$$\varphi = \tan^{-1}\left(\frac{Q}{I}\right) \tag{2}$$

The pulse sequence server 110 may receive patient data from a physiological acquisition controller 130. By way of example, the physiological acquisition controller 130 may receive signals from a number of different sensors connected to the patient, including electrocardiograph ("ECG") signals from electrodes, or respiratory signals from a respiratory bellows or other respiratory monitoring devices. These signals may be used by the pulse sequence server 110 to synchronize, or "gate," the performance of the scan with the subject's heart beat or respiration.

The pulse sequence server 110 may also connect to a scan room interface circuit 132 that receives signals from various sensors associated with the condition of the patient and the magnet system. Through the scan room interface circuit 132, a patient positioning system 134 can receive commands to move the patient to desired positions during the scan.

The digitized magnetic resonance signal samples produced by the RF system 120 are received by the data acquisition server 112. The data acquisition server 112 operates in response to instructions downloaded from the operator workstation 102 to receive the real-time magnetic resonance data and provide buffer storage, so that data is not lost by data overrun. In some scans, the data acquisition server 112 passes the acquired magnetic resonance data to the data processor server 114. In scans that require information derived from acquired magnetic resonance data to control the further performance of the scan, the data acquisition server 112 may be programmed to produce such information and convey it to the pulse sequence server 110. For example, during pre-scans, magnetic resonance data may be acquired and used to calibrate the pulse sequence performed by the pulse sequence server 110. As another example, navigator signals may be acquired and used to adjust the operating parameters of the RF system 120 or the gradient system 118, or to control the view order in which k-space is sampled. In still another example, the data acquisition server 112 may also process magnetic resonance signals used to detect the arrival of a contrast agent in a magnetic resonance angiography ("MRA") scan. For example, the data acquisition server 112 may acquire magnetic resonance data and processes it in real-time to produce information that is used to control the scan.

The data processing server 114 receives magnetic resonance data from the data acquisition server 112 and processes the magnetic resonance data in accordance with instructions provided by the operator workstation 102. Such processing may include, for example, reconstructing two-dimensional or three-dimensional images by performing a Fourier transformation of raw k-space data, performing other image reconstruction algorithms (e.g., iterative or backprojection reconstruction algorithms), applying filters to raw k-space data or to reconstructed images, generating functional magnetic resonance images, or calculating motion or flow images.

Images reconstructed by the data processing server 114 are conveyed back to the operator workstation 102 for storage. Real-time images may be stored in a data base memory cache, from which they may be output to operator display 102 or a display 136. Batch mode images or selected real time images may be stored in a host database on disc storage 138. When such images have been reconstructed and transferred to storage, the data processing server 114 may notify the data store server 116 on the operator workstation 102. The operator workstation 102 may be used by an operator to archive the images, produce films, or send the images via a network to other facilities.

The MRI system 100 may also include one or more networked workstations 142. For example, a networked workstation 142 may include a display 144, one or more input devices 146 (e.g., a keyboard, a mouse), and a processor 148. The networked workstation 142 may be located within the same facility as the operator workstation 102, or in a different facility, such as a different healthcare institution or clinic.

The networked workstation 142 may gain remote access to the data processing server 114 or data store server 116 via the communication system 140. Accordingly, multiple networked workstations 142 may have access to the data processing server 114 and the data store server 116. In this manner, magnetic resonance data, reconstructed images, or other data may be exchanged between the data processing server 114 or the data store server 116 and the networked workstations 142, such that the data or images may be remotely processed by a networked workstation 142.

Figure 2:
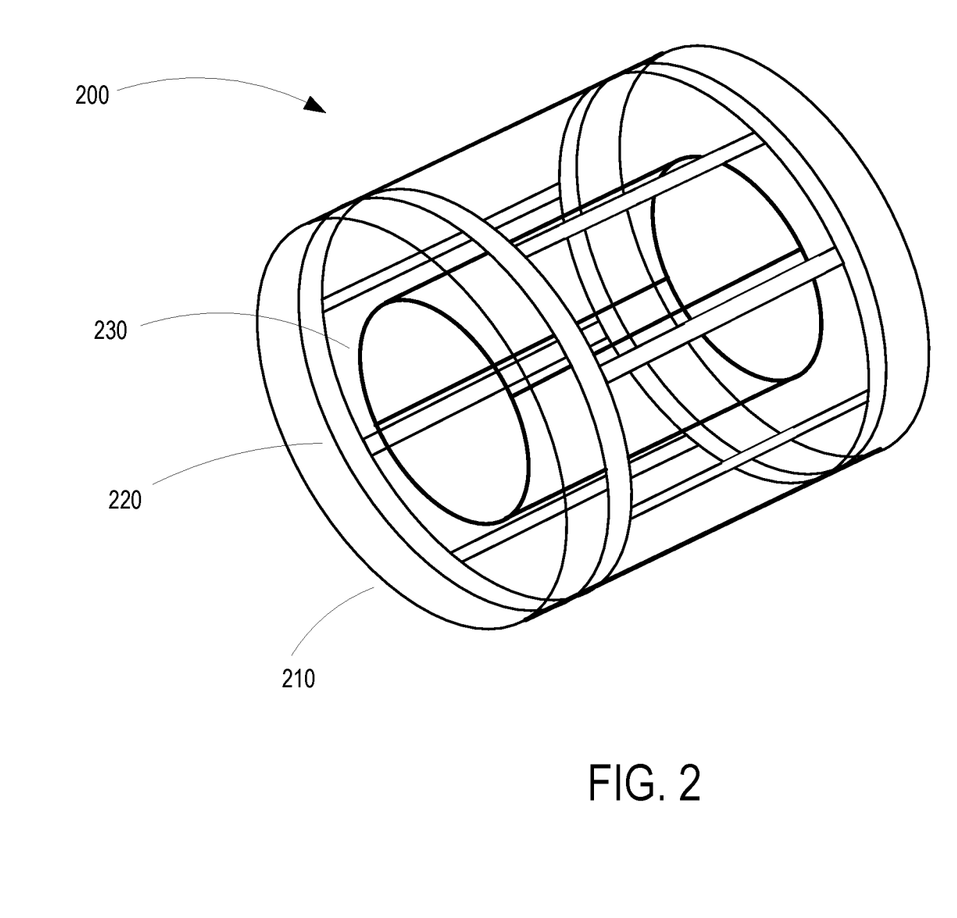
FIG. 2 is a schematic illustration of one aspect of an MR imaging system including a radio frequency (RF) antenna device in accordance with the present disclosure.

Referring particularly to FIG. 2, a dual-tuned MR coil 200 is shown. The dual-tuned MR coil 200 is capable of imaging both protons and phosphorus, whether simultaneously or in serial. A phosphorus imaging coil 210 is coaxial with a proton imaging coil 230 that is located inside the phosphorus coil 210. Each coil is made up of a series of electrically conductive traces 220. The dual-tuned MR coil 200 may be a Quadrature Transmit Array Receive (QTAR) head coil. As one example configuration, the dual-tuned MR coil 200 can include eight phosphorus receive channels located on phosphorus coil 210, and a single proton quadrature receive channel located on proton coil 230. However, any number of channels may be used, and any anatomical shape of the coil may be deployed, such as a knee coil, shoulder coil, or as a surface coil, and the like. In other embodiments, the organization of the coils may be changed, such that the proton coil is located outside the phosphorus coil.

The chemical composition of each voxel may be represented by spectra, or as an image in which the signal intensity depends on the concentration of an individual metabolite being analyzed. Alternatively, frequency-selective pulses may be used to excite only a single spectral component of interest. Pulse sequences that may be used with the present disclosure include the inversion recovery method, chemical shift selective imaging sequence, chemical shift insensitive slice selective RF pulse, the saturation method, spatial and chemical shift encoded excitation and quantitative chemical shift imaging. Non-Cartesian sampling strategies may be employed with the pulse sequence, such as spiral or radial sampling. Cartesian sampling may be used where a pseudo-spiral structure is traced out in Cartesian gridding k-space, such as a squared-off spiral in or spiral out sampling pattern.

Figure 3:
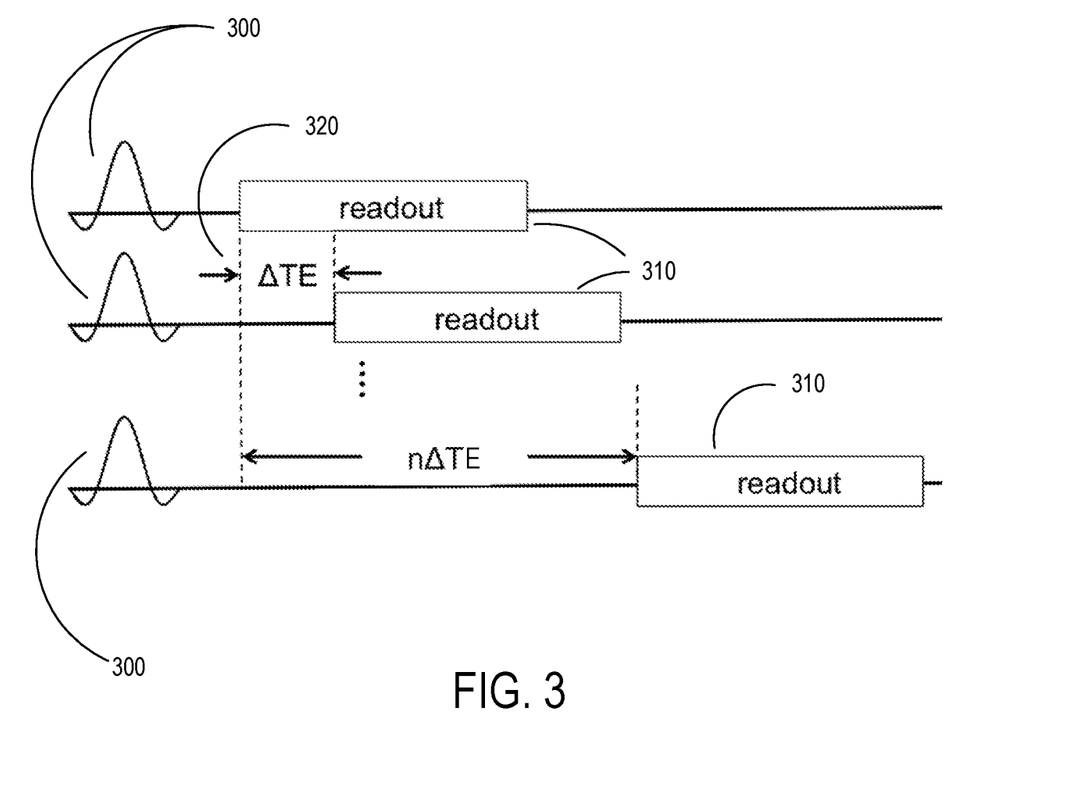
FIG. 3 is a graphical representation of an example pulse sequence that may be implemented with the present disclosure.

Referring particularly to FIG. 3, an example of an axial 2D spiral chemical shift imaging (CSI) MR pulse sequence that may be used with the present disclosure is shown. CSI has application in MR spectroscopy, allowing metabolite information to be measured in an extended region and to allow for the chemical analysis of body tissues. The pulse sequence shown in FIG. 3 includes following each slice-selective 90 degree RF excitation 300 with a single-shot spiral readout 310, as shown. The spiral readout 310 may sample the entirety of 2D k-space, or may have acceleration routines that allow for decreased scan time. The waveform of the spiral readout is designed based on the image parameters such as the field-of-view (FOV), imaging resolution, and gradient hardware limits. Gradient rewinders are used at the end of each spiral readout to get the sampling trajectory back to the center of k-space. The echo time was sequentially shifted by ATE 320 between excitations to achieve spectral encoding. The same spiral readout 310 is then repeated a specified number of times (n) and over an interval throughout the duration of the free induction decay. In the following echo-shifted excitations, the start time of the first single shot spiral is delayed by ATE, which determines the chemical shift encoding spectral bandwidth. The number of single-shot spirals played out in all excitations (number of excitations multiplied by number of spiral readouts in one single excitation) determines the spectral resolution. The repetition time (TR) may be kept short, such as being reduced to 2 s, to control the scan time.

In another embodiment, a multi-echo spiral sequence may be used as well as incorporating a proton decoupler to increase signal-to-noise ratio (SNR). Increasing the SNR of the phosphorus data may result in not needing to acquire data for as long a period of time, and so the overall scan time may be decreased for each action taken to increase SNR.

One example phantom configured for use with methods described in the present disclosure includes a two-peak phosphorus cylindrical vial phantom. Such a can phantom include 50 mM of phenylphosphonic acid (PPA) mixed with 100 mM phosphoric acid. These two different compounds produce two different, distinct peaks when the spectrum of the phantom is acquired. Phantom results can exhibit an 824 Hz (16 ppm) separation between peaks, with the "half height" PPA peak and the "full height" phosphoric acid peak. Such example results are based upon using this two-peak phantom with the sequence shown in FIG. 3 and the following parameters: 24 cm FOV, 5 s TR, 8192 µs spiral readout length, 90 degree flip angle, 125 kHz bandwidth, 30 mm slice thickness, 500 µs ATE, 2 kHz spectral width and a total scan time of 5:20. Patient imaging may feature a shorter TR, such as 2 s, but include additional acquisitions. For example, if 16 NEX are used with similar scan parameters but with a TR of 2 s, then the total scan time would be 34:08 for a subject. This scan time is short enough for a phosphorus imaging sequence, such as is depicted in FIG. 3, to be implemented clinically.

Figure 4:
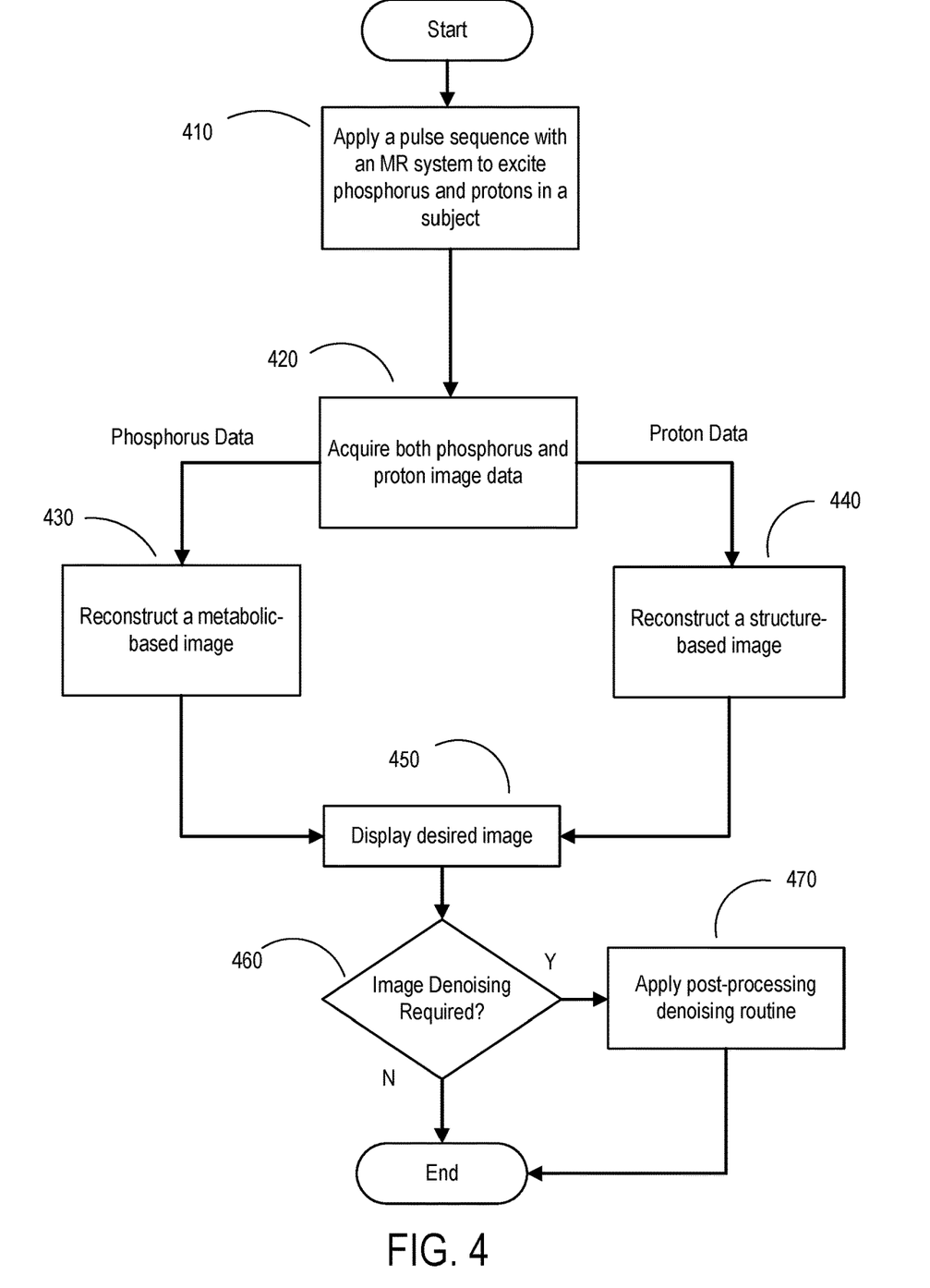
FIG. 4 is a flow chart setting forth the steps of an example of a method for generating phosphorus and proton images of a subject

Referring now to FIG. 4, a flowchart is shown as illustrating the steps of an example method for generating phosphorus and proton images with an MRI system. The method includes applying a pulse sequence with the MRI system to a subject at step 410. This pulse sequence may be any pulse sequence that has been selected to excite both phosphorus and protons within an imaging object or subject. In some implementations, the phosphorus and proton signals are separately excited (e.g., serially excited); however, in other implementations the phosphorous and proton signals may be simultaneously excited. Image data are acquired using a RF coil of the MR system for both phosphorus and protons at step 420. As noted, is some configurations, image data are acquired simultaneously for both phosphorus and protons at step 420. An example RF coil that may be used in this simultaneous acquisition step 420 was shown in FIG. 2. The proton signals can be acquired as first data, and the phosphorous signals as second data. As noted, these first and second data can be acquired serially, or simultaneously.

A metabolic-based image may be reconstructed at step 430 using the phosphorus image data acquired at step 420. A structure-based image (e.g., an anatomical image) may be reconstructed at step 440 using the proton image data acquired at step 420. One or both of these images may be displayed at step 450. The display at 450 is based upon user preference and what is displayed may be selected as either the phosphorus image, the proton image, or a combination of the data in these two images, or the phosphorus data may be represented as a spectrum rather than an image. Thus, a first image can be reconstructed from the first data, such that the first image depicts anatomical structures in the subject as represented by the proton signals. A second image can also be reconstructed from the second data, such that the second image depicts metabolic information as represented by the phosphorous signals.

If image denoising is desired as determined at decision block 460, then a denoising routine can be run at step 470 to increase SNR, increase contrast-to-noise ratio (CNR), enhance an image feature, or enhance the detectability of an object, tissue, or spectral peak in the image.

Figure 5:
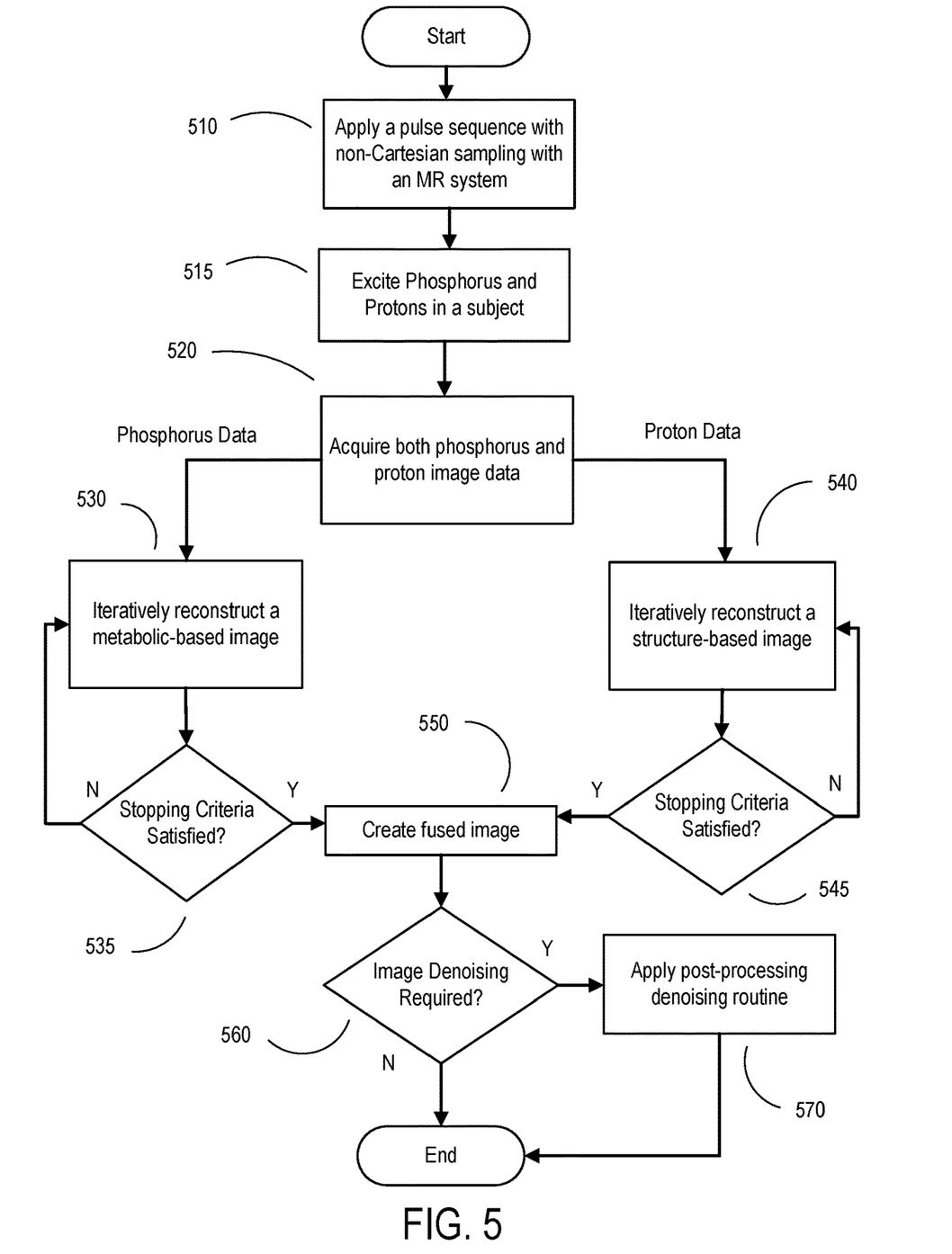
FIG. 5 is a flow chart setting forth the steps of an example of a method for generating a fused phosphorus and proton image of a subject.

Referring now to FIG. 5, a flowchart is illustrated as setting forth the steps of an example method for generating a fused phosphorus and proton image of a subject. The method includes applying a pulse sequence with non-Cartesian sampling with an MRI system to acquire data from a subject at step 510. An example of such a sequence is shown in FIG. 3. This pulse sequence has been selected to excite both phosphorus and protons within an imaging object or subject as indicated at step 515. Image data are acquired using a RF coil of the MR system for both phosphorus and protons at step 520. In some implementations, the phosphorus and proton data are separately excited and acquired (e.g., serially excited); however, in other implementations the phosphorous and proton data may be simultaneously excited and acquired. An example RF coil that may be used in this simultaneous acquisition step 520 is shown in FIG. 2.

A metabolic-based image may be iteratively reconstructed at step 530 using the phosphorus image data acquired at step 520, and after reaching a desired stopping point as indicated at 535. A stopping point may be based upon image or spectrum quality, a SNR, CNR, or object detectability metric, or the number of iterations may be preselected by the user. A structure-based image (e.g., an anatomical image) may be iteratively reconstructed at step 540 using the proton image data acquired at step 520 and after reaching a desired stopping point as indicated at 545. A stopping point may be based upon image quality, a SNR, CNR, or object detectability metric, or the number of iterations may be preselected by the user. In other implementations, metabolic-based and/or structure-based images can be reconstructed using non-iterative techniques. A fused image incorporating data from both the phosphorus and proton data may be created and at step 550. For instance, the fused image can be generated by selectively combining the metabolic-based and the structure-based images. The fused image can be generated based on user preference, and what is displayed may be selected as either the metabolic information from the phosphorus image overlaid with the structural information of the proton image, or a spectrum from the phosphorus data being displayed with a proton image. If image denoising is desired as determined at decision block 560, then a denoising routine can be run at 570 to increase SNR, increase CNR, enhance an image feature, or enhance the detectability of an object, tissue, or spectral peak in the image. The metabolic-based image, structure based-image, and/or fused image can then be displayed to a user.

In one aspect of the disclosure, a model-based iterative reconstruction (MBIR) algorithm, or framework, for MRSI data acquired with an IDEAL-type non-Cartesian pulse sequence can be used to reconstruct images. Image data are input to the MBIRM algorithm, generating output as reconstructed images, which may be reconstructed directly from the raw k-space data. Unlike conventional reconstruction routines that nominally perform gridding; IDEAL species separation and decomposition; and coil-combination sequentially, this routine reconstructs MR spectroscopy images directly from raw k-space data. This example reconstruction model directly and simultaneously estimates a multi-channel, multi-species data set from k-space data via locally low-rank regularized least-square regression with embedded non-uniform fast Fourier transform (NUFFT)-based gridding. NUFFT allows for management of all domain transform operations and using locally low-rank (LLR) regularization enables totally calibration-free parallel imaging reconstruction. As this reconstruction strategy is mathematically explicit, it can be executed using any standard large-scale convex optimization strategy (e.g., parallel proximal gradient iteration), including both deterministic and stochastic variants. This approach also prospectively utilizes optimal coil combination concepts.

As non-limiting examples, the reconstruction techniques described in U.S. Pat. Nos. 8,989,465, 9,709,650, or Patent Application No. PCT/US2018/026417, which are herein incorporated by reference in their entirety, can be used.

Figure 6:
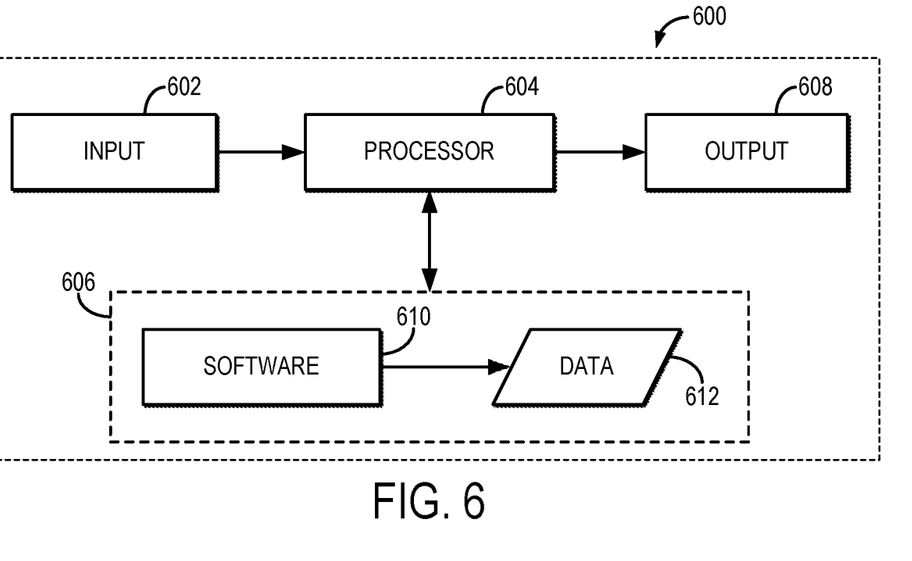
FIG. 6 is a block diagram of an example computer system that can implement aspects of the present disclosure.

Referring now to FIG. 6, a block diagram of an example of a computer system 600 that can perform the methods described in the present disclosure is shown. The computer system 600 generally includes an input 602, at least one hardware processor 604, a memory 606, and an output 608. Thus, the computer system 600 is generally implemented with a hardware processor 604 and a memory 606.

In some embodiments, the computer system 600 can be a workstation, a notebook computer, a tablet device, a mobile device, a multimedia device, a network server, a mainframe, one or more controllers, one or more microcontrollers, or any other general-purpose or application-specific computing device.

The computer system 600 may operate autonomously or semi-autonomously, or may read executable software instructions from the memory 606 or a computer-readable medium (e.g., a hard drive, a CD-ROM, flash memory), or may receive instructions via the input 602 from a user, or any another source logically connected to a computer or device, such as another networked computer or server. Thus, in some embodiments, the computer system 600 can also include any suitable device for reading computer-readable storage media.

In general, the computer system 600 is programmed or otherwise configured to implement the methods and algorithms described in the present disclosure. For instance, the computer system 600 can be programmed to reconstruct images from phosphorus data, proton data, or both, and to generated fused images as described.

The input 602 may take any suitable shape or form, as desired, for operation of the computer system 600, including the ability for selecting, entering, or otherwise specifying parameters consistent with performing tasks, processing data, or operating the computer system 600. In some aspects, the input 602 may be configured to receive data, such as data acquired with an MRI system. Such data may be processed as described above to reconstruct metabolic-based images and/or anatomical images, and to generate fused images. In addition, the input 602 may also be configured to receive any other data or information considered useful for reconstructing images, generating fused images, or generating spectra using the methods described above.

Among the processing tasks for operating the computer system 600, the one or more hardware processors 604 may also be configured to carry out any number of post-processing steps on data received by way of the input 602, including denoising routines such as those described above The memory 606 may contain software 610 and data 612, such as data acquired with an MRI system, and may be configured for storage and retrieval of processed information, instructions, and data to be processed by the one or more hardware processors 604. In some aspects, the software 610 may contain instructions directed to reconstructing metabolic-based images from phosphorous data, reconstructing anatomical images from proton data, generating fused images, and so on.

In addition, the output 608 may take any shape or form, as desired, and may be configured for displaying metabolic-based images, anatomical images, fused images, and spectra, in addition to other desired information.

The present disclosure has described one or more preferred embodiments, and it should be appreciated that many equivalents, alternatives, variations, and modifications, aside from those expressly stated, are possible and within the scope of the invention.

The invention claimed is:

1. A method for generating images from data acquired from proton spins and phosphorus spins using a magnetic resonance imaging (MRI) system, the method comprising:
 a) acquiring first data from a subject using an MRI system, wherein the first data are indicative of proton signals;
 b) acquiring second data from the subject using the MRI system, wherein the second data are indicative of phosphorus signals;
 c) reconstructing a first image from the first data, wherein the first image is a proton image that depicts anatomical structures in the subject; and
 d) reconstructing a second image from the second data, wherein the second image is a phosphorus image that has voxels whose signal intensity depends on a concentration of phosphorus in each voxel such that the second image depicts metabolic information in the subject;
 wherein the first data and the second data are acquired using a dual-tuned radio frequency (RF) coil,
 wherein the dual-tuned RF coil is a quadrature transmit array receive (QTAR) coil comprising a multi-channel phosphorus coil section that is tuned to the phosphorus spins and a single-channel proton coil section that is tuned to the proton spins, the QTAR coil comprising only a single channel tuned to the proton spins.

2. The method of claim 1, wherein the second data are acquired using an axial two-dimensional spiral chemical shift imaging (CSI) pulse sequence that excites phosphorus spins in the subject.

3. The method of claim 1, wherein the dual-tuned RF coil is operated to simultaneously acquire the first data and the second data from the subject.

4. The method of claim 1, wherein the second image is reconstructed by inputting the second data to a model-based iterative reconstruction (MBIR) algorithm, generating output as the second image reconstructed directly from raw k-space data in the second data.

5. The method of claim 4, wherein the MBIR algorithm includes simultaneously estimating a multi-channel, multi-species data set from k-space data via locally low-rank regularized least-square regression with embedded non-uniform fast Fourier transform (NUFFT)-based gridding that does not need a separate calibration acquisition.

6. The method of claim 1, wherein the total time duration from acquiring the first data and second data to reconstructing the first image and the second image is less than 40 minutes.

7. The method of claim 1, further comprising generating a fused image using the first image and the second image, wherein the fused image includes selectively combining the first image and the second image such that the fused image depicts a combination of the anatomical structures represented by the proton signals and the metabolic information represented by the phosphorus signals.

8. A system for acquiring data using a magnetic resonance imaging (MRI) system, comprising:
 a radio frequency (RF) system comprising at least one dual-tuned RF coil and an RF generator configured to excite proton spins and phosphorus spins and to receive magnetic resonance signals therefrom, wherein the dual-tuned RF coil is a quadrature transmit array receive (QTAR) coil that comprises a multi-channel phosphorus coil section that is tuned to phosphorus spins and a single-channel proton coil section that is tuned to proton spins, and wherein the RF system comprises only a single channel tuned to proton spins;
 a computer system configured to:
  operate the RF system to excite proton spins and acquire first data from a subject, wherein the first data are indicative of proton signals;
  operate the RF system to excite phosphorus spins and acquire second data from the subject, wherein the second data are indicative of phosphorus signals;
  reconstruct a first image from the first data, wherein the first image is a proton image that depicts anatomical structures in the subject; and
  reconstruct a second image from the second data, wherein the second image is a phosphorus image that has voxels whose signal intensity depends on a concentration of phosphorus in each voxel such that the second image depicts metabolic information in the subject.

9. The system of claim 8, wherein the computer system is configured to operate the RF system such that the first data and the second data are simultaneously acquired using the dual-tuned RF coil.

10. The system of claim 8, wherein the dual-tuned RF coil includes a proton coil section and a phosphorus coil section that is coaxial with the proton coil section.

11. The system of claim 8, wherein the computer system reconstructs the second image by inputting the second data to a model-based iterative reconstruction (MBIR) algorithm, generating output as the second image reconstructed directly from raw k-space data in the second data.

12. The system of claim 11, wherein the MBIR algorithm includes simultaneously estimating a multi-channel, multi-species data set from k-space data via locally low-rank regularized least-squares regression with embedded non-uniform fast Fourier transform (NUFFT)-based gridding that does not need a separate calibration acquisition.

13. The system of claim 8, wherein the computer system is configured to:
 generate a fused image by selectively combining the first image and the second image such that the fused image depicts a combination of the anatomical structures represented by the proton signals and the metabolic information represented by the phosphorus signals.

\* \* \* \* \*